June 11, 1963        J. E. NEFF        3,093,047
REMOTE CONTROLLED SOLENOID ACTUATED SHUTTER
Filed Jan. 9, 1961
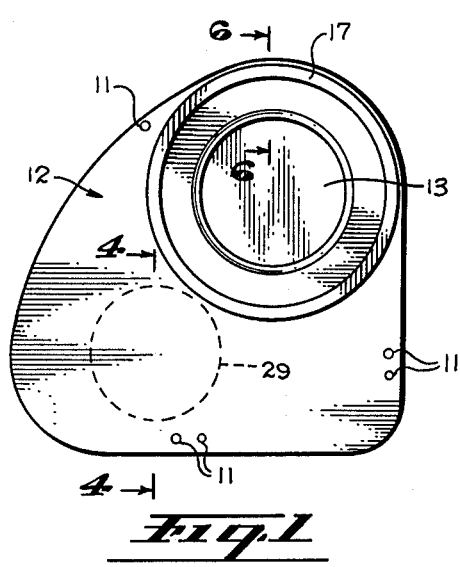
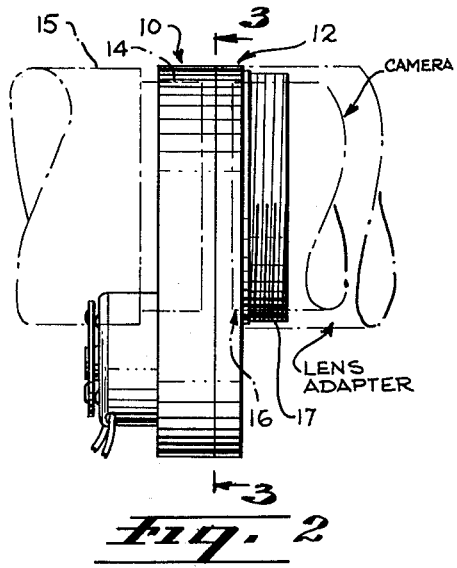
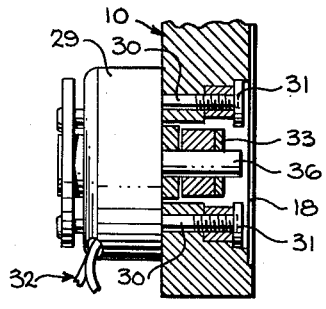
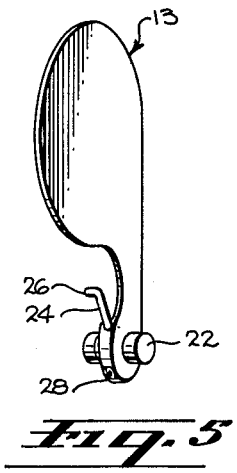
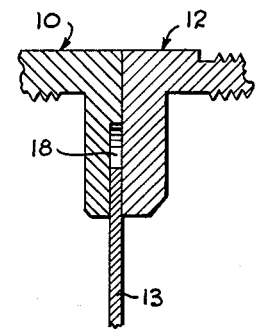
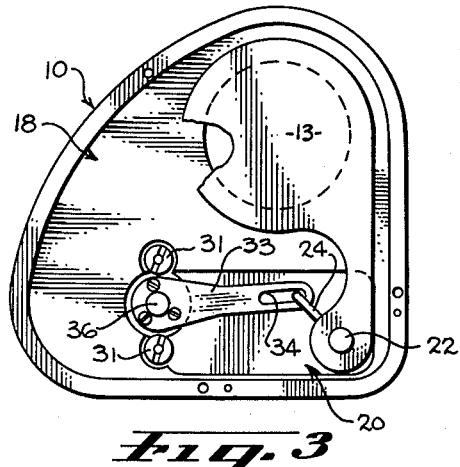
*INVENTOR.*
John E. Neff

United States Patent Office 3,093,047
Patented June 11, 1963

3,093,047
REMOTE CONTROLLED SOLENOID ACTUATED SHUTTER
John E. Neff, 545 Fairmont Ave., Mountain View, Calif.
Filed Jan. 9, 1961, Ser. No. 81,657
2 Claims. (Cl. 95—59)
(Granted under Title 35, U.S. Code (1952), sec. 266)

The invention described herein may be manufactured and used by or for the Government of the United States of America for governmental purposes without the payment of any royalties thereon or therefor.

This invention relates to a light shutter device for cameras, more particularly, it relates to a remotely controlled shutter device for cameras to be mounted externally of the camera.

It is an object of this invention to provide a remotely controlled light shutter device for relatively high speed cameras which is light-tight.

It is another object of the invention to provide a remotely controlled light shutter device for cameras which can be used in plurality to simultaneously photograph a number of events.

The invention is described below in conjunction with the accompanying drawing which is hereby made a part of this specification, and in which FIG. 1 is a top plan view of the shutter device of the invention looking in the direction of the cover plate;

FIG. 2 is an end elevational view of the device of the invention showing camera and lens adapters in phantom;

FIG. 3 is an internal view of the case showing the shutter and linkage assembly;

FIG. 4 is a partial section taken on line 4—4 of FIG. 1;

FIG. 5 is a perspective view of the shutter of the device, and

FIG. 6 is a section on line 6—6 of FIG. 1.

Reference is now made to the figures, in which like parts are represented by like numerals. Referring to FIG. 1, the case and cover plate of the device are designated by the numerals 10 and 12, respectively. Case 10 and cover plate 12 are secured together by screws as shown at 11. Other convenient fastening means, such as bolts may be used. Case 10 and mating cover plate 12 are provided with openings which mate and form a light aperture when case and cover plate are assembled. In FIG. 1 the light aperture is obstructed by shutter 13 shown in the closed position.

Referring now to FIG. 2, an internally threaded adapter well 14 in case 10 is shown for mounting an adapter 15 (shown in phantom) which serves as a channel for the passage of light from the event being photographed to the light aperture. A camera well 16 is formed by a cut out portion in cover plate 12 and internally and externally threaded rim 17 extending therefrom. Camera and lens adapters (shown in phantom) may be threadably attached to rim 17 as shown. It will be noted from FIG. 2 that the cut out portion of camera well 16 extends into cover plate 12. The described construction provides a small space separation between the bottoms of adapter well 14 and camera well 16 thereby resulting in a short distance for light to travel from adapter to the camera lens. As shown in FIG. 6, a shutter well 18 is cut out of the internal face of case 10 to provide a slot when case and cover plate are assembled for shutter 13 to reciprocate in.

The linkage by which shutter 13 is operated and its operation is described by reference to FIGS. 3, 4 and 5. The linkage is positioned in indentation 20 in the internal face of case 10. As shown in FIG. 5, the shutter 13 is provided with shutter pin 22 and shutter lever arm 24 having hook 26 on its end. The lever 24 is mounted in a circular raised section 28 at the end of shutter 13. As shown in FIG. 3, shutter 13 is mounted for movement in shutter well 18 by mounting shutter pin 22 for rotation in a hole (not shown) in case 10. Solenoid 29 is provided for reciprocating shutter 13 from closed to open position. The solenoid 29 is mounted on case 10 as shown in FIG. 4 by means of threaded pins 30 and internally threaded receptacle pins 31. Current is provided to the solenoid through electrical leads 32. Shutter lever arm 24 is connected to solenoid lever arm 33 by means of hook 26 and slot 34 in solenoid lever arm 33. Solenoid lever arm 33 is securely attached to solenoid actuating pin 36 so that it moves with it. Solenoid 29 is of the type disclosed in United States Patent No. 2,496,880 in which solenoid actuating pin 36 is spring-biased into a position referred to herein and as shown in FIG. 3 as the closed position. Actuation of the solenoid by electrical signals rotates the pin 36 in a clockwise direction (FIG. 3) to the open shutter position. When the signal is cut off the spring-biased pin is rotated in a counter-clockwise direction by the action of a spring to bring the shutter to the closed position.

In operation, actuation of the solenoid 29 by an electrical signal serves to open the shutter 13 and maintain it in the open position for making exposures, until current is cut off. The device described herein has been used in plurality to simultaneously photograph a number of oscilloscope presentations; obviously it is not limited to this application. In use it has been found to be absolutely light-tight, have a rapid response and to be extremely reproducible. It is simple in construction and operation and is sufficiently compact for use in applications wherein space is limited.

It will be apparent from the above description that many modifications are possible in the light of the above teaching. It is, therefore, to be understood that within the scope of the appended claims the invention may be practiced otherwise than as specifically described herein.

What is claimed is:

1. A camera shutter device, comprising, in combination, a case having an opening therein and a rim around its inner edge extending vertically from its inner face and defining a shutter well, said shutter well having an indentation in the bottom thereof; a cover plate having an opening therein, the case and cover plate constructed to fit together in light-tight arrangement with the peripheries of the openings mating to form a light aperture; said case having an internally threaded adapter well concentric with the opening in the case depending from the outer surface of the case, said opening in the case being cut out of the bottom of said adapter well and having a diameter less than that of the adapter well whereby a thin section of said bottom remains; said cover plate having an adapter well concentric with the opening in it depending from its outer face, said opening in the cover plate being cut out of the bottom of said adapter well in the cover plate and having a diameter less than that of the cover plate adapter well, whereby a thin section of the bottom of the cover plate adapter well remains; an internally and externally threaded rim abutting said cover plate adapter well; a thin shutter mounted to reciprocate in said shutter well having a wide portion and a narrow neck section having a raised portion at its end; a shutter pin securely mounted in said neck section extending transversely thereof; a shutter lever arm having a hook at its end mounted in said raised portion in the plane of said shutter and at an acute angle to said neck section; said shutter pin being mounted in said indentation for rotation; a solenoid mounted on the outer surface of said case; a spring-biased solenoid actuated pin in said solenoid extending into said indentation; a solenoid lever arm secured at one end to said solenoid actuated pin and having a laterally extending slot near its other end, the hook of said shutter lever arm riding in said slot; whereby actuation of said solenoid serves to rotate said spring-biased solenoid actuated pin and correspondingly said shutter in one direction and in actuation of said solenoid permits return of said actuated pin and shutter to their original positions.

2. The device of claim 1 in which said shutter lever arm is mounted at substantially 45° from said neck section and said solenoid lever arm is mounted substantially perpendicular to said neck section.

References Cited in the file of this patent

UNITED STATES PATENTS

| | | |
|---|---|---|
| 339,910 | Marvin | Apr. 13, 1886 |
| 2,496,880 | Leland | Feb. 7, 1950 |
| 2,730,937 | Martin | Jan. 17, 1956 |